United States Patent [19]

Edwards

[11] 4,334,259

[45] Jun. 8, 1982

[54] DISCHARGE/GROUND BUTTON

[75] Inventor: James M. Edwards, Santa Ana, Calif.

[73] Assignee: Management Assistance Inc., New York, N.Y.

[21] Appl. No.: 177,255

[22] Filed: Aug. 11, 1980

[51] Int. Cl.³ .......................... H05F 3/00; H01G 1/00

[52] U.S. Cl. ...................................... 361/212; 361/216; 174/35 CE

[58] Field of Search ........................ 361/212, 216, 220; 174/35 CH, 35 MS

[56] References Cited

U.S. PATENT DOCUMENTS

| | | | |
|---|---|---|---|
| 2,477,267 | 7/1949 | Robinson . | |
| 3,019,281 | 1/1962 | Hartwell | 174/35 GC |
| 3,594,490 | 7/1971 | Mitchell | 174/35 MS |
| 3,889,043 | 6/1975 | Ducros | 174/35 GC |

FOREIGN PATENT DOCUMENTS

| | | | |
|---|---|---|---|
| 487463 | 6/1938 | United Kingdom | 174/35 GC |

OTHER PUBLICATIONS

"Static Electricity Discharged from Quick-Access Panels", LCS *Electronic Design,* Jan. 1, 1975, p. 128.
*Electronic Weatherstrip and RF Gaskets,* Metal Textile Corp. Catalog, Form EW-4.
"Safe, Sure, Sealing", Parker Seal Co. Catalog #5801.
"Conductive Gasket", *IBM Tech. Disclosure Bulletin,* vol. 17, No. 9, Feb. 1975.

*Primary Examiner*—J. D. Miller
*Assistant Examiner*—L. C. Schroeder
*Attorney, Agent, or Firm*—Amster, Rothstein & Engelberg

[57] ABSTRACT

An electronic cabinet having a conductive frame and a conductive removable access panel or door is grounded by a ground button. The ground button comprises a donut-shaped core of resilient material supported by a mounting plate. A layer of knitted-metal wire mesh at least partially surrounds the exterior of the core and the mounting plate. The button is constructed to be mounted to one surface of the cabinet with the layer of knitted-metal wire mesh in contact therewith. When the access panel or door is closed, the button is deformed between the frame and access panel or door to provide a positive conductive leak path therebetween.

3 Claims, 3 Drawing Figures

FIG. 2.
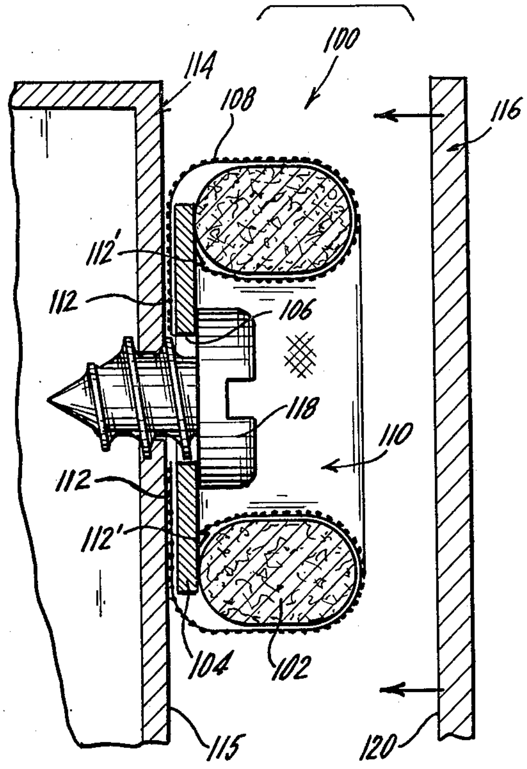
FIG. 3.
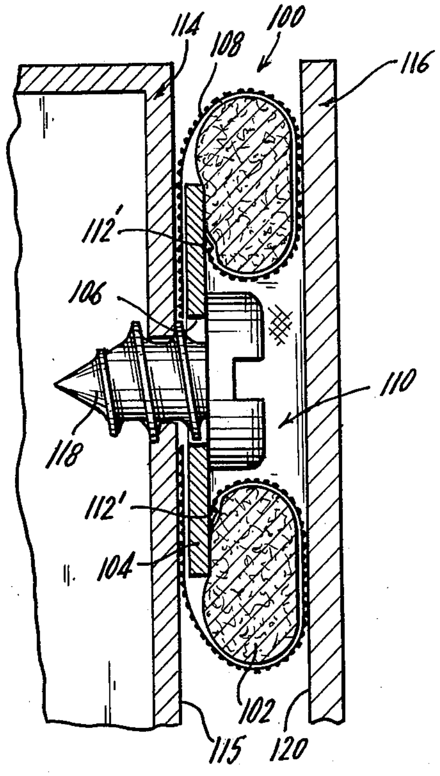
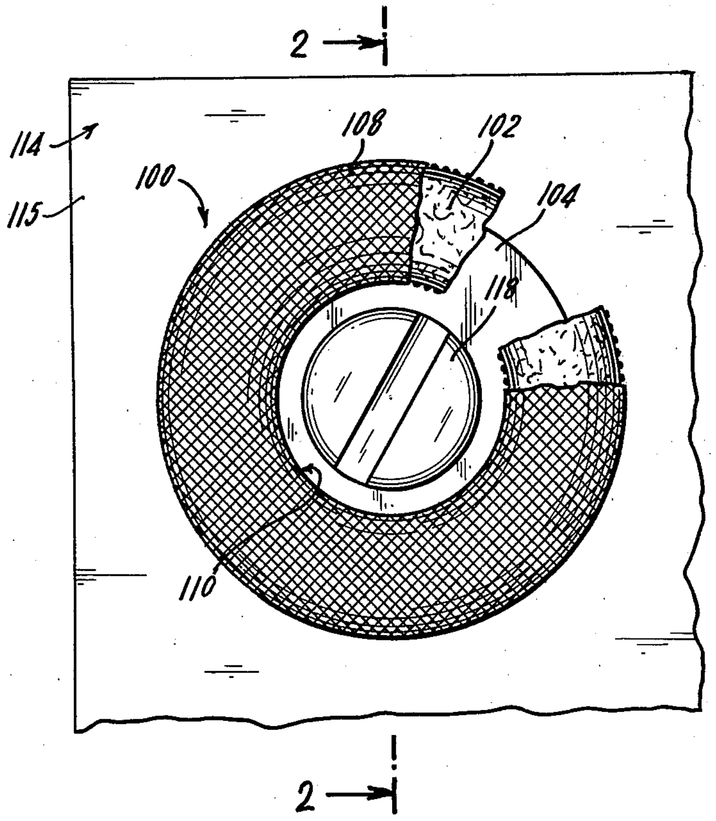
FIG. 1.

DISCHARGE/GROUND BUTTON

DESCRIPTION OF THE INVENTION

This invention relates in general to an electrical grounding system, and more particularly, to a discharge/ground button for providing a conductive leak path between a conductive frame and an access panel or door of an electronic cabinet.

Electronic devices, such as digital computers which operate on low-level signals, are susceptible to erratic operation in the presence of electrical noise. One common form of electrical noise is that created by an electrostatic discharge between the computer and operating personnel when, for example, such personnel attempt to gain access to the computer's components for servicing through a removable access panel. A static discharge to an improperly grounded access panel can introduce errors, stop computer processing or obliterate or alter the contents of some memory units.

Discharge/ground buttons have been used to provide a ground for the access panel and to still allow for easy panel removal to gain access to the computer's components. One such button has been constructed from a cylindrically shaped core of sponge material surrounded by knitted-metal wire mesh. The core and wire mesh are inserted into a cadmium-plated steel cup which is preformed into a cylindrical shape having a retaining lip formed around the open end. The wire mesh and core extend beyond the open end of the cup to form a generally flat contact surface. The button is press-fitted in a punched or pre-drilled hole on the frame of the cabinet or on a flange of the access panel. A conductive leak path is created by the wire mesh contacting the panel and the steel cup engaging the frame.

The construction of the above-noted button is generally cost ineffective due to the tooling needs and associated cost required for fabricating the steel cup. Further, the wire mesh covered core lacks the flexibility to compensate for irregularities in the planarity of either the panel or frame and to still maintain the wire mesh in contact therewith over a large area. Thus, the contact area provided by the button is generally ineffectively utilized to form a conductive leak path between the panel and frame. Still further, the press-fit installation of the button often comes loose during use or as a result of improper tolerances between the hole and cup, causing poor contact with the button thereby reducing its effectiveness in providing a conductive leak path. Still further, the wire mesh is only in contact with the surface of the cabinet, the other surface being in contact with the steel cup. The steel cup creates an additional resistance barrier which must be overcome in providing a conductive leak path. These noted disadvantages require the use of additional buttons and their associated costs to increase the contact area and provide a sufficient current carrying conductive leak path between the frame and access panel of an electronic cabinet.

Thus, there is a need for a discharge/ground button which provides an effective conductive leak path between a conductive frame and a conductive access panel of an electronic cabinet to ground any spurious static discharges created when attempting to gain access thereto.

It is broadly an object of the present invention to provide a discharge/ground button which overcomes or avoids one or more of the foregoing disadvantages resulting from the use of conventional buttons. Specifically, the present invention provides a discharge/ground button constructed to provide a large metallic area in direct contact with a surface of the access panel and frame to provide a direct effective conductive leak path between the access panel and the frame for grounding static discharges.

A further object of the present invention is to provide a discharge/ground button that can compensate for the lack of planarity of the surface of either the access panel or frame of an electronic cabinet.

A still further object of the present invention is to provide a discharge/ground button that is constructed to be easily mounted and firmly secured to either the access panel or frame of an electronic cabinet.

A still further object of the present invention is to provide a discharge/ground button which eliminates the use of a preformed steel cup.

In accordance with one embodiment of the present invention, there is provided a discharge/ground button for grounding a cabinet having a conductive frame and removable access panel. The button includes a core, preferably donut-shaped, of resilient material mounted to a supporting plate. A layer of conductive material, such as knitted-metal wire mesh, at least partially surrounds the exterior of the core and a portion of the mounting plate. The button is constructed and arranged to be mounted to one surface of the cabinet with the layer of knitted-metal wire mesh in contact with the cabinet surface. When the access door is closed, the button is deformed between the conductive frame and access panel. Direct electrical contact is achieved between the conductive frame and access panel through the conductive material to provide a direct conductive leak path threrebetween.

The above brief description as well as further objects, features, and advantages of the present invention will be more fully understood by reference to the following detailed description of a presently preferred but nonetheless illustrative discharge/ground button in accordance with the present invention when taken in conjunction with the accompanying drawings, wherein:

FIG. 1 is a front elevation showing the discharge/ground button constructed from a donut-shaped core supported by an annular ring-shaped mounting plate and covered with a layer of knitted-metal wire mesh, with a section of the core and wire mesh removed to expose a portion of the mounting plate and a portion of the wire mesh removed to expose a portion of the core;

FIG. 2 is a side sectional elevation taken along lines 2—2 of FIG. 1 showing the discharge/ground button removably mounted to a cabinet frame opposite an access panel, and having a portion of the knitted-metal wire mesh in direct contact with the surface of the cabinet frame; and FIG. 3 is a side sectional elevation similar to FIG. 2 showing the access panel in the closed position against the cabinet frame and the discharge/ground button deformed therebetween to provide a direct conductive leak path between the cabinet frame and the access panel.

Referring specifically to FIG. 1, a discharge/ground button 100 is illustrated according to the present invention. The button 100 is constructed from a donut-shaped core 102 of generally deformable resilient material. An annular ring-shaped mounting plate 104 having a central aperture 106, see FIG. 2, supports the core 102. As best shown in FIG. 2, a layer 108 of conductive material, such as metal wire mesh, at least partially surrounds the exterior of the core 102 and the outwardly facing surface of mounting plate 104. The donut-shape of the core 102 provides the button 100 with a central opening 110, which in one embodiment is aligned with the aperture 106 of the mounting plate 104.

In accordance with the embodiment shown in FIG. 2, the button 100 is constructed from a donut-shaped core 102 of medium-hard neoprene sponge supported by an annular ring-shaped mounting plate 104. A conductive layer 108 of Monel knitted-metal wire mesh surrounds the exterior surface of the core 102 and the outwardly facing surface of the mounting plate 104. The loose ends of the conductive layer 108 are spot welded or soldered to the mounting plate 104 at locations 112, 112'. Alternatively, a plurality of conductive layers 108 may be wrapped around the exterior of the core 102 such that one free end of the conductive layer 108 is wrapped inside an outer layer and secured thereby, thus requiring the spot welding or soldering of only one loose end at location 112.

Referring to FIG. 2, the installation of the button 100 to an electronic cabinet is now described. The button 100 may be removably mounted to either the frame 114 or to the access panel 116. As shown in FIGS. 2 and 3, the frame 114 has been provided with a pre-drilled or pre-punched mounting hole to receive a mounting screw 118. The mounting screw 118 is inserted through the opening 110 and into the aperture 106 to secure the button 100 to the frame 114 by engagement with the mounting hole. Where it is desired to permanently mount the button 100 to the frame 114 or access panel 116, a rivet may be used instead of the mounting screw 118. With the button 100 mounted adjacent the frame 114, that portion of the conductive layer 108 which extends over the outwardly facing surface of the mounting plate 104 is in direct contact with one surface of the frame to provide a direct conductive leak path thereto.

In accordance with another embodiment of the present invention, the aperature 106 is not required to be in direct alignment with the central opening 110. For example, the mounting plate 104 may be provided with extending tabs (not shown) having apertures located beyond the radial extent of the core 102 for securing the button 100 to the frame 114 or panel 116.

Referring to FIGS. 2 and 3, the operation of the button 100 in providing a direct conductive leak path between the frame 114 and the panel 116 is now described. As the panel 116 is moved in the direction of the arrows, the inner surface 120 of the panel 116 first makes initial contact with the outermost portion of the conductive layer 108. As shown in FIG. 3, as panel 114 is closed, the panel deforms the core 102 thereby increasing the contact area between the conductive layer 108 and the panel. The donut-shaped construction of the core 102 further allows the button 100 to compensate for irregularities in the planarity of the surface of the panel 116, and to still remain in maximum contact with the conductive layer 108. The conductive layer 108 being in direct contact with the surface 115 of the panel 114, and the inner surface 120 of access door 116, provides a direct conductive leak path for a static discharge between the frame 114 and the panel 116 without an additional resistance barrier therebetween.

The use of a discharge/ground button constructed according to the present invention provides many advantages over the use of buttons constructed according to the prior art. For example, the mounting screw 118 allows the button 100 to be firmly attached to the frame 114 without the potential of coming loose during extending use. The direct contact of the conductive layer 108 with one surface of the frame 114, and access panel 116 provides an effective direct conductive leak path between the panel and frame for grounding spurious static discharges. The donut-shape of the core 102 provides a larger and more efficient contact area and thereby a more effective conductive leak path between the frame 114 and panel 116, and which further is effective to compensate for the lack of planarity in the surface of either the panel or frame. When operating personnel remove the panel 116 to gain access to the computer's components, the deformed core 102 returns to its initial shape, as a result of the resilient and spongy nature of the core material.

Although the invention herein has been described with reference to particular embodiments, it is to be understood that these embodiments are merely illustrative of the principles and the application of the present invention. The core may be constructed other than in a donut-shape, such as cylindrical, square or rectangular. Further, the conductive layer may be constructed other than from knitted-metal wire mesh, such as non-woven wire screening. Still further, the discharge/ground button can be installed to one surface of the access panel of the cabinet with equal effectiveness in providing direct contact between the panel and frame for discharging static electricity. Thus, it is to be understood that numerous modifications may be made in the illustrative embodiments and other arrangements may be devised without departing from the spirit and scope of the present invention as defined by the appended claims.

What is claimed is:

1. A grounding button for providing a conductive leak path between a conductor frame and an access door of an electrical cabinet comprising a core formed of an annulus of deformable resilient material having an inside diameter forming a central opening, a planar circular mounting plate having an outside diameter sized to be intermediate the inside and outside diameter of the annular core and having an upper and lower planar surface, a portion of the resilient core being in contact with and supported by the planar upper surface of the mounting plate, a layer of knitted wire mesh electrically connected to an upper surface of the mounting plate, at least partially surrounding the exterior of said resilient core and surrounding the lower surface of the mounting plate to form a continuous electrically conductive path so that both the conductive frame and access door will be in electrical contact with the knitted wire mesh when the access door is closed, said grounding button being secured to the cabinet by a securing means to bring the knitted wire mesh surrounding the lower surface of the mounting plate into electrical conductive contact with a surface of the cabinet whereby when the access panel is closed the grounding button is deformed between the access panel and the conductive frame and both the access door and conductive frame are in electrical contact with the knitted wire mesh thereby creating direct electrical contact between the access door and conductive frame to provide a conductive leak path between the same.

2. The button as set forth in claim 1 further having a plurality of conductive layers of knitted wire mesh wrapped around the exterior of said resilient core and said mounting plate such that a free end of said knitted wire mesh is wrapped inside an outer layer thereof and secured by said outer layer.

3. The button as set forth in claim 2 wherein said mounting plate has a central aperture in direct alignment with the central opening formed by the annular core.

* * * * *